United States Patent
Li et al.

(10) Patent No.: US 7,521,153 B2
(45) Date of Patent: Apr. 21, 2009

(54) CORROSION PROTECTION USING PROTECTED ELECTRON COLLECTOR

(75) Inventors: Wen Li, Ann Arbor, MI (US); Yutaka Oyama, Aichi (JP); Keiichi Kohama, Shizuoka (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 103 days.

(21) Appl. No.: 11/080,722

(22) Filed: Mar. 15, 2005

(65) Prior Publication Data

US 2006/0019168 A1 Jan. 26, 2006

Related U.S. Application Data

(60) Provisional application No. 60/553,443, filed on Mar. 16, 2004, provisional application No. 60/553,636, filed on Mar. 16, 2004, provisional application No. 60/571,776, filed on May 17, 2004.

(51) Int. Cl.
*H01M 4/66* (2006.01)

(52) U.S. Cl. ..................... 429/245

(58) Field of Classification Search .......... 429/218.1, 429/231.95, 129, 136, 142, 144, 223, 226, 429/231.4, 231.8, 231.5, 221, 34, 30, 33, 429/38, 39, 41, 44, 245, 188
See application file for complete search history.

(56) References Cited

U.S. PATENT DOCUMENTS

| | | | |
|---|---|---|---|
| 3,639,100 A | 2/1972 | Rick | 23/202 |
| 4,448,611 A | 5/1984 | Grellet et al. | 148/6.11 |
| 4,456,664 A * | 6/1984 | Crosbie et al. | 429/104 |
| 4,463,071 A | 7/1984 | Gifford et al. | 429/194 |
| 4,568,620 A * | 2/1986 | Wright et al. | 429/104 |
| 4,764,437 A * | 8/1988 | Kaun | 429/50 |
| 4,965,146 A * | 10/1990 | McCullough et al. | 429/102 |
| 4,992,345 A * | 2/1991 | Meintjes et al. | 429/103 |
| 5,314,765 A | 5/1994 | Bates | 429/194 |
| 5,518,839 A | 5/1996 | Olsen | 429/192 |
| 5,552,241 A | 9/1996 | Mamantov et al. | 429/103 |
| 5,589,291 A | 12/1996 | Carlin et al. | 429/103 |
| 5,591,544 A | 1/1997 | Fauteux et al. | 429/209 |
| 5,938,914 A | 8/1999 | Dawless et al. | 205/391 |
| 6,117,580 A * | 9/2000 | Nitschke et al. | 429/34 |
| 6,224,824 B1 | 5/2001 | Zhang et al. | 420/94 |
| 6,326,104 B1 | 12/2001 | Caja et al. | 429/188 |
| 6,365,301 B1 | 4/2002 | Michot et al. | 429/307 |
| 6,402,795 B1 | 6/2002 | Chu et al. | 29/623.5 |
| 6,413,284 B1 | 7/2002 | Chu et al. | 29/623.1 |
| 6,495,287 B1 | 12/2002 | Kolb et al. | 429/215 |
| 6,544,691 B1 | 4/2003 | Guidotti | 429/344 |
| 6,797,428 B1 | 9/2004 | Skotheim et al. | 429/126 |

(Continued)

FOREIGN PATENT DOCUMENTS

WO    WO 98/38649    *   9/1998

*Primary Examiner*—Patrick Ryan
*Assistant Examiner*—Monique Wills
(74) *Attorney, Agent, or Firm*—Gifford, Krass, Sprinkle, Anderson & Citkowski, P.C.

(57) ABSTRACT

A battery comprises a first electrode, a second electrode, an electrolyte, and an electron collector associated with the first electrode, the electron collector having a surface treatment, such as a protection layer, that reduces corrosion of the electron collector by the molten salt electrolyte.

1 Claim, 1 Drawing Sheet

U.S. PATENT DOCUMENTS

2003/0059684 A1* 3/2003 Takami et al. .............. 429/326
2004/0258998 A1 12/2004 Vallee
2005/0164085 A1* 7/2005 Bofinger et al. ............. 429/224
2006/0019167 A1* 1/2006 Li ............................. 429/233

* cited by examiner

CORROSION PROTECTION USING PROTECTED ELECTRON COLLECTOR

REFERENCE TO RELATED APPLICATIONS

This application claims priority to U.S. Provisional Patent Application Ser. Nos. 60/553,443 and 60/553,636, both filed Mar. 16, 2004; and 60/571,776, filed May 17, 2004, the entire content of all of which are incorporated herein by reference.

FIELD OF THE INVENTION

The present invention relates to batteries, in particular to electron collectors used in rechargeable lithium batteries.

BACKGROUND OF THE INVENTION

Molten salt electrolytes are considered safer than traditional organic electrolytes, especially for automobile applications. However, corrosion of the electron collector severely affects the performance of batteries having a molten salt electrolyte, degrading cycling ability and high rate performance. Corrosion results from the oxidation of the molten salt electrolyte on the surface of the metal collector, typically aluminum (Al) or iron (Fe), during charge or discharge. The corrosion can significantly reduce the lifetime of the battery.

Hence, if corrosion of the electron collector can be reduced, the use of safer lithium ion (Li-ion) batteries becomes practical, for example, for automobile applications.

U.S. Pat. No. 5,518,839 to Olsen describes nickel-coated aluminum electron collectors in solid-state electrochemical cells. However, this does not describe protection of electron collectors in a Li-ion battery with molten salt electrolyte.

Patents referenced in this specification are incorporated herein by reference.

SUMMARY OF THE INVENTION

A battery comprises a first electrode, a second electrode, an electrolyte such as a molten salt electrolyte, and an electron collector associated with the first electrode. The electron collector has a surface treatment, the surface treatment reducing corrosion of the electron collector by the molten salt electrolyte. The surface treatment may be a protection layer, such as a protection layer comprising an oxide, a nitride, a sulfide, a phosphide, and/or a carbide. The protection layer can be a metal film having a substantially greater corrosion resistance than the electron collector, such as tungsten, or a surface alloy formed on the material of the electron collector, such as an aluminum alloy formed on an aluminum electron collector. The protection layer may include one or more materials selected from a group of materials consisting of metals, metal alloys, metal carbides, metal oxides, and metal phosphides, examples of which include tungsten, titanium carbide, tantalum carbide, aluminum oxide, titanium oxide, nickel oxide, copper phosphide, nickel phosphide, iron phosphide, and iron nitride.

The surface treatment may also be an anodization of the electron collector, or a treatment that substantially lowers the surface potential of the electron collector. In one example, the electron collector is substantially aluminum metal, and the protection layer is an aluminum alloy having a lower aluminum content than the electron collector.

In one example, the battery is a lithium-ion battery having a molten salt electrolyte; however the improved electron collectors described herein may be used in other battery technologies, for example those based on other cationic species.

An improved battery includes an electron collector having a protection layer on the surface of the electron collector. In one example, the electron collector is an aluminum foil, and the protection layer comprises a material, such as an electron-conducting material, selected from the group consisting of: oxides having at least one element which belongs to group 2 to 14 in the third or subsequent period of the periodic table as a constituent element thereof; carbides having at least one element which belongs to group 2 to 14 in the third or subsequent period of the periodic table as a constituent element thereof; nitrides having at least one element which belongs to group 2 to 14 in the third or subsequent period of the periodic table as a constituent element thereof; and tungsten. Examples include tin oxide, titanium oxide indium-tin oxide, tantalum oxide, tungsten oxide, chromium oxide, and thallium oxide. Protection layers may also include magnesium oxide, barium titanate, titanium oxide, zirconium oxide, aluminum oxide, and silica, which have excellent electrochemical stability. Other example protection layers include oxides, carbides, nitrides of Ti, Zr, Hf, V, Nb, Ta, Cr, Mo and W, and combinations of materials discussed herein (such as oxynitrides, oxycarbides, mixed metal compounds (oxides, nitrides, and carbides), and the like.

DETAILED DESCRIPTION OF THE INVENTION

Figure 1:
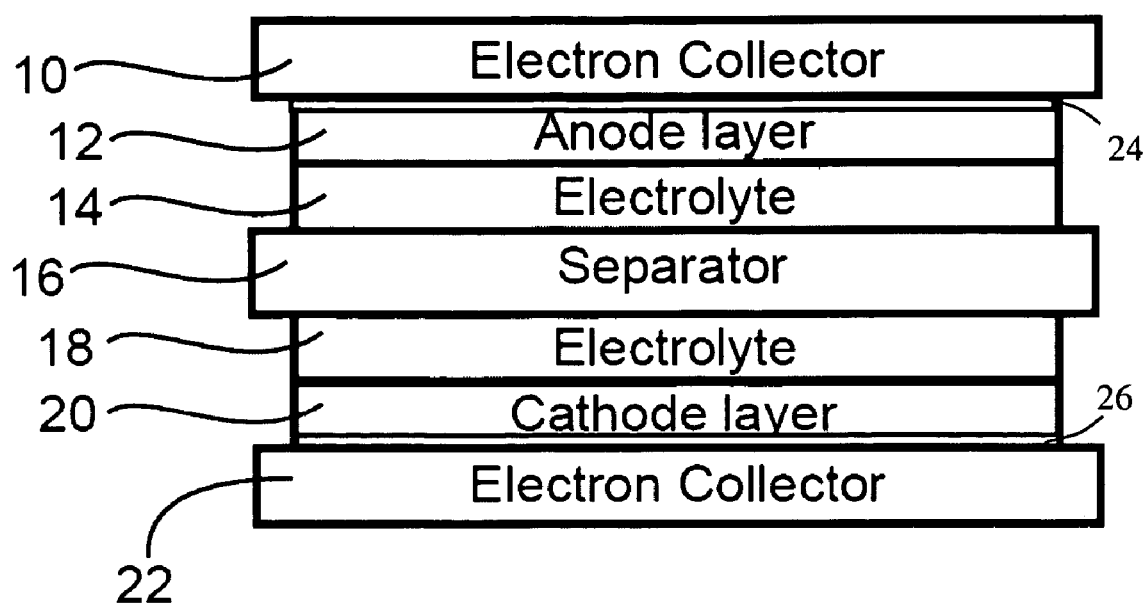
FIG. 1 shows a structure of a battery having electron collectors, each electron collector having a protection layer.

A protection layer comprising one or more electron conducting materials can be used in a protection layer disposed on a surface which would otherwise be in contact with a molten salt, so as to prevent or slow corrosion of the surface. For example, the surface of an Al electron collector within a molten salt Li-ion battery can support a protection layer comprising one or more electron conducting materials so as to substantially prevent corrosion of the Al surface by the molten salt electrolyte.

Improved electron conductive materials have been developed for use as protection layers. Electron conductive materials for use in protection layers used within a Li-ion battery with a molten salt electrolyte are described. These protection layers can reduce or eliminate decomposition of the surface on which they are disposed, for example, the surface of an electron collector. The electron conductive materials may have properties including: high electron conductivity, non-reactivity with molten salts, particulate form (such as nanoparticles, having an average diameter in the range 0.5 nm -1 micron), and high density.

An electrically conductive material typically may have an electrical conductivity of at least $1 \times 10^{-2}$ S/cm, more preferably at least $1 \times 10^3$ S/cm, in the ordinary state of use and operating temperature of the battery.

Protection layers are described which can reduce or eliminate the problem of corrosion of the electron collector by molten salt electrolytes within a lithium ion battery. Electron collectors may include aluminum, iron, other metal, or other electrically conducting material. Approaches include physical coating of the electron collector by electron conducting materials, chemical coating (for example, decreasing the Al surface potential by oxidation additives), and/or providing promoted Al with an Al-alloy thin film.

Novel methods and materials are described for providing a protection layer on a component surface, (such as an electrode collector, negative electrode, positive electrode, other electrical component, or housing component) in contact with a molten salt electrolyte, so as to slow or prevent corrosion of the component surface.

FIG. 1 shows a Li-ion battery structure, showing electron collectors 10 and 22, negative electrode layer (anode layer) 12, electrolyte at 14 and 18, separator 16, and positive electrode 20. The positive electrode includes a cathode electroactive material, electron conductive material, and binder material, and the negative electrode includes anode electroactive material, electron conductive material, and binder material. The electron collectors are each covered by a protection layer, shown at 24 and 26.

If the electrolyte is a molten salt electrolyte, and the electron collectors each comprise an aluminum foil (often the case in a conventional Li-ion battery), the electrolyte decomposes on the aluminum foil.

In certain examples described herein, the provision of a protection layer to an Al electron collector in a molten salt Li-ion battery is described. The provision of a protection layer on the surface of the Al electron collector can substantially prevent corrosion of the Al electron collector by a molten salt electrolyte, and can improve cyclability of a molten salt Li-ion battery.

However, the invention is not limited to the provision of protection layers to Al electron collectors. Electron collectors formed from other materials can be provided with a protection layer according to the present invention. Protection layers, of the same or different composition, can also be applied to the negative electrode and/or positive electrode, or to other battery component surfaces which would otherwise be in contact with a molten salt.

Protected electron collectors are described which reduce the problem of corrosion of the electron collector by molten salt electrolytes within a battery, such as a lithium ion battery. Electron collectors may comprise aluminum, iron, another metal, or other electrically conducting materials. Approaches to protection layer formation include physical coating of the electron collector by electron conducting materials, chemical coating (for example, decreasing the Al surface potential using oxidation additives), and/or providing promoted Al with an Al-alloy thin film.

In one approach, a protection layer is provided to the electron collector, for example, by a physical coating method. The protection layer transmits electrons to or from the electron collector. The protection layer may include an electrically conductive polymer.

Electron collectors, for example used in rechargeable lithium-based battery systems, may be coated with one or more protection layers. Example protection layers comprise tungsten (W), platinum (Pt), titanium carbide (TiC), tantalum carbide (TaC), tungsten carbide (WC), titanium oxide (for example, $Ti_4O_7$), copper phosphide ($Cu_2P_3$), nickel phosphide ($Ni_2P_3$), iron phosphide (FeP), and the like. The chemical. formulas given are exemplary. For example, the term titanium oxide also includes $TiO_2$, and non-stoichiometric compounds of titanium and oxygen, and likewise with other compounds mentioned.

An improved electron collector may comprise aluminum, or other metal susceptible to corrosion by a molten salt electrolyte, and a protection layer on the surface of the aluminum (or other electron collector material) acting to reduce corrosion of the electron collector. Hence, an improved battery includes a molten salt electrolyte, electrodes (positive electrode and negative electrode), and electron collectors, which have a surface treatment which reduces corrosion of the electron collector by the molten salt electrolyte.

The surface treatment to the electron collector may include chemical and/or physical deposition processes, chemical bath, anodization technique, or other process or combination of processes. Electron collectors can include aluminum, copper, iron, steel (such as stainless steel), nickel, zinc, conducting polymers, metalized polymers (such as metalized Mylar), and the like.

A protection layer may include a polymer, such as a polyalklyene oxide (such as polyethylene oxide), conducting polymer (such as (such as polyethylene oxide), conducting polymer (such as a polypyrrole, polyaniline, polythiophene, polyvinylidene fluoride, derivatives thereof, or other electrically conducting polymer), polycarbonate, PVDF, polymer complex, and the like.

Protection Layer Composition

In other examples, a protection layer applied to an electron collector may comprise a material such as a metal or metal alloy, boride, carbide, nitride, oxide, fluoride, other halide, silicide, phosphide, sulfide (or other chalcogenide). Examples include metal compounds (including transition metal compounds) such as: metal borides, metal carbides, metal nitrides, metal oxides, metal fluorides (and other metal halides), metal silicides, metal phosphides, and metal chalcogenides. Compounds may be mixed metal compounds, for example including two or more metal species. Protection layers may also comprise an oxynitride, oxycarbide, or other compound including one or more atom from the group C, N, O, Si, P, and S.

Protection layers may comprise a layer of solid electrolyte, glassy material, crystalline material, amorphous material, elastomer, sol-gel, and the like. A protection layer may include a polymer, such as a polyalklyene oxide (such as polyethylene oxide), conducting polymer (such as a polypyrrole), polycarbonate, PVDF, polymer complex (e.g. with a lithium compound), and the like. Certain compounds may fall into one or more categories discussed herein.

Iron-based protection layers can provide corrosion resistance to molten salts containing alkali oxides. Such iron-based materials, such as steels, may be used to protect electron collectors within batteries according to the present invention. The protection layer can also comprise a nickel-containing alloy, such as described in U.S. Pat. No. 6,224,824 to Zhang.

An iron (or iron-containing) electron collector can be nitrided to reduce corrosion by the electrolyte, so that the protection layer includes iron nitride. An electron collector, such as an iron electron collector, can be surface treated using an oxidizing bath to reduce surface corrosion, for example using an oxidizing bath such as described in U.S. Pat. No. 4,448,611 to Grellet et al. Protection layers may comprise copper, silver, or copper-silver alloys, for example as described in U.S. Pat. No. 5,938,914 to Dawless et al.

U.S. Pat. No. 5,591,544 to Fauteux et al. describes methods of reducing the interfacial impedance of an aluminum electron collector, including coating with a primer material. Such materials may be used in place of, or in addition to, other techniques to reduce electron collector corrosion.

The electron collector may be coated with a metal film, for example an electroplated metal film, for example using the electroplating techniques described in U.S. Pat. No. 5,518,839 to Olsen. Nickel plated, or other metal or alloy plated electron collectors, may be used in a Li-ion battery having a molten salt electrolyte.

In another approach, one or more oxidation additives are disposed on the surface of the electron collector, decreasing the surface potential of the electron collector, and reducing its corrosion by the molten salt electrolyte. For example, using an aluminum electron collector, an $Al_2O_3$ or NiO thin film could reduce the Al oxidation potential.

In a further approach, the electron collector can be coated with a thin alloy film, the alloy being resistant to corrosion by the electrolyte. For example, an aluminum electron collector can be coated with an aluminum alloy. The aluminum alloy may be an alloy between aluminum and one or more transition metals.

U.S. Pat. No. 6,402,795 to Chu et al. discloses lithium ion transmitting materials, such as lithium phosphorus oxynitride, which can be used as protection layers for electrodes, and which may also be used in embodiments of the present invention. Lithium ion transmitting materials used for electrode protection layers may also be used as protection layers for electron collectors. For example, protection layers may comprise a lithium compound (such as a lithium salt), lithium alloy (such as LiAl alloys),), lithium oxide, hydroxide, or other lithium compound. Protection layers may include a compound which forms intercalation compounds with lithium ions (such as titanium disulfide), or other sulfide.

In another example, an oxide coating can be formed on the surface of the electron collector by forming a halide coating one the electron collector, with the oxide coating being formed subsequently, for example by exposing to a combination of heat and oxygen, other chemical treatment, and/or exposure of the halide layer to the molten salt electrolyte in the battery. Halide layers can, for example, be formed using a process adapted from that described in U.S. Pat. No. 3,639, 100 to Rick. A protection layer of titanium dioxide can be formed on an electron collector by a process including the formation of a titanium halide layer on the electron collector, followed by heating in air.

Protection layers comprise mixtures, such as composites, of a first conducting material and a second material. The first conducting material may be a metal, conducting polymer, or other conducting material. The second material may be an oxide (such as a metal oxide), carbide, sulfide, nitride, or other material. Composites of two or more materials such as described herein may be used as protective layers.

In other examples, the protection layer can comprise a material that is non-reactive (e.g. non-catalytic) with respect to the molten salt electrolyte. The protection layer can include inorganic electronic conductive materials (such as metals, metal oxides, metal carbides, and the like), organic electron conductive materials such as a conducting polymer, or a combination of organic and inorganic materials (such as inorganic particles mixed with an organic polymer), or ormosil.

The protection layer can comprise both organic and inorganic constituents. For example, the protection layer can include a mixture of inorganic particles (such as TiC, TaC, or W particles) and an electron conducting polymer.

The protection layer can include a metal (such as a transition metal), metal alloy, metal oxide, metal carbide, metal nitride, metal oxide, metal oxynitride, metal oxycarbide, or metal phosphide. Examples include W, Pt, TiC, TaC, WC, or $Ti_4O_7$.

The protection layer can include an oxide, other oxygen-containing compound (such as a phosphate or sulfate), a carbide, a phosphide, a nitride, an oxynitride, a sulfide, a compound including a metal and one or more other elements (such as elements selected from a group consisting of S, N, O, C, and P), a halide, conducting glass, silicon compound, semiconductor, conducting plastic, ceramic, alloy, or other conducting (including semiconducting) material.

The protection layer can be a material, such as an electron-conducting material, for example a material selected from the group consisting of: oxides having at least one element which belongs to group 2 to 14 in the third or subsequent period of the periodic table as a constituent element thereof; carbides having at least one element which belongs to group 2 to 14 in the third or subsequent period of the periodic table as a constituent element thereof; nitrides having at least one element which belongs to group 2 to 14 in the third or subsequent period of the periodic table as a constituent element thereof; and tungsten. Examples include $SnO_2$, $Ti_4O_7$, $In_2O_3/SnO_2$ (ITO), $Ta_2O_5$, $WO_2$, $W_{18}O_{49}$, $CrO_2$ and $Tl_2O_3$, in which the oxidation number of the metal in the oxide is relatively high, and hence the resistance to oxidation is good. Examples also include MgO, $BaTiO_3$, $TiO_2$, $ZrO_2$, $Al_2O_3$, and $SiO_2$, which have excellent electrochemical stability. Other examples include oxides, carbides, nitrides of Ti, Zr, Hf, V, Nb, Ta, Cr, Mo and W, and combinations of materials discussed herein (such as oxynitrides, oxycarbides, mixed metal compounds (oxides, nitrides, and carbides), and the like. The protection layer can be non-electrically conducting in bulk, if when used as a thin film, does not increase the cell impedance beyond an acceptable value.

The protection layer can include an alloy, such as a transition metal alloy, an aluminum alloy (which may be an alloy including aluminum and one or more transition metals), or other alloy, or intermetallic compound. The alloy can be more resistant to corrosion by the electrolyte than the underlying surface. For example, an aluminum electron collector can be coated with an aluminum alloy. The aluminum alloy may be an alloy between aluminum and one or more transition metals.

A protection layer can include a non-metal oxide, or other non-metal compound. The protection layer thickness can be monolayer, sub-nanoscale, nanoscale (0.5 nm-1 micron), or microscale (1 micron-1 mm).

An electron conducting material can be in the form of a film, or particulates deposited on the surface of the electron collector. The protection layer may comprise granules, spheres, rods, flakes, or other particle forms. An electron conducting material, if particulate, may have a distribution of sizes, or may be substantially monodisperse. Particle size scales may be nanoscale, microscale, or millimeter-scale, depending on the size of the battery or advantageous properties desired. Electron conducting particles may also be provided with a coating to prevent or reduce decomposition problems. A particulate protection layer, or other protection layer, can further include binding or filling agents, for example to increase mechanical strength and/or to reduce voids.

Non-conducting or conducting particle cores can be coated with a conducting coating of a second conducting material to provide an improved electron conducting material. The thickness of a thin film on a particle can be substantially less than an effective dimension (e.g. diameter) of the particle. The film thickness can be selected to as to allow substantial electron transmission through the coating.

A carbon film or carbon particles can be additionally coated with a thin oxide, nitride, carbide, or tungsten film. For example, carbon coated with a metal oxide, metal nitride, metal carbide, or tungsten or other transition metal, such as platinum, can be used as a protection layer. For example, a thin metal oxide film such as $TiO_2$ can be used as a protection layer.

A protection layer can also be formed by treatment of a component surface. For example, an aluminum surface of an electron collector can be treated so as to induce formation of a protection layer on an aluminum substrate. For example, surface reactions between aluminum and a reagent, or surface alloying so as to form protective aluminum alloy coatings can be used.

One or more oxidation additives can be disposed on the surface of the electron collector, decreasing the surface potential of the electron collector, and reducing its corrosion by the molten salt electrolyte. For example, using an aluminum electron collector, an $Al_2O_3$ or NiO thin film could reduce the Al oxidation potential. Protection layers can function through a surface potential reduction, by prevention of contact between the molten salt and the surface, by another mechanism, or by any combination of mechanisms.

A protection layer applied to an electron collector may include a lithium compound (such as a lithium salt), lithium alloy (such as LiAl alloys), oxide (for example, a metal oxide such as a transition metal oxide, lithium oxide, or mixed oxide), hydroxide, other transition metal compound (such as a transition metal chalcogenide), a compound which forms intercalation compounds with lithium ions (such as titanium disulfide), other sulfide, a layer of solid electrolyte, glassy material, crystalline material, amorphous material, elastomer, sol-gel, and the like. A protection layer may include a polymer, such as a polyalklyene oxide (such as polyethylene oxide), conducting polymer (such as a polypyrrole), polycarbonate, PVDF, polymer complex (e.g. with a lithium compound), and the like. Certain compounds may fall into one or more of the above categories.

Improved protection layers described herein may be applied to surfaces of one or more components, such as the negative electrode, positive electrode, electrode collector, or other component of a molten salt type battery. Improved protection layers described herein may also contain other materials, such as conventional binding agents, as are well known in the battery art.

Electron conducting materials disclosed herein may also be used with in conjunction with other electrolytes (i.e. non-molten salt electrolytes), or in other systems, as appropriate.

Hence, materials that are non-reactive materials to a molten salt can be coated on an electron collector, e.g. an Al electron collector, providing improved performance, for example compared with an Al-Rexam sheet coated with carbon. Protection layers can be applied to both the electron collector and the positive electrode.

Two or more of the herein-described materials or methods may be combined so as to enhance corrosion resistance of the electron collector.

Protection Layer Formation

The protection layer may form as a result of a surface treatment of the electron collector. The surface treatment may be: a physical or chemical deposition process; chemical bath treatment; acid treatment; galvanic plating (electroplating); deposition of metal using an organic carrier (such as a polymer or complex) followed by elimination of the organic component by heat, solvent, or other means; or other process or combination of processes.

The protection layer may comprise an oxide of a different metal than found in the electron collector, for example an aluminum electron collector may have a titanium dioxide protection layer. A metal film can be deposited, then oxidized.

The electron collector may be pre-treated before formation of the protection layer, for example by deposition of a monolayer (for example, a metal monolayer) or other thin film to enhance adhesion of the protection layer.

The protection layer can form as a reaction between the electron collector and an electrolyte, or between the electron collector and a suitable additive within the electrolyte. The protection layer can be deposited on an electron collector using chemical or physical deposition methods, such as evaporation, sublimation, physical vapor deposition, chemical vapor deposition, plasma treatment, sputtering, thermal treatment, photochemical treatment, silane treatment, anodization, and the like.

The protection layer can also be an electrically conducting polymer, such as polyaniline, polypyrrole, polythiophene, polyvinylidene fluoride, derivatives thereof, or other electrically conducting polymer.

The protection layer can be formed by any thin film coating or deposition process, alloy formation process, or other process. The protection layer may be used with, or formed by interaction with, an appropriate molten salt electrolyte, or other battery components.

Protection layers can be formed by adding a small quantity of aqueous or organic material to the molten salt electrolyte, and may be formed by a reaction of a component of the molten salt electrolyte with the electron collector, or may be formed by a treatment of a electron collector such as evaporative deposition of a component that reacts with the material of the electron collector to form a protective film.

In other examples, an electrode in contact with or otherwise proximate to the electron collector may comprise a component that interacts with the electron collector so as to form the protection layer on the electron collector. The protection layer may be formed by a reaction between a material within the molten salt electrolyte and the electron collector, on an initial charge or discharge of the cell.

The protection layer can be in the form of a sheet, or deposited as particles, such as a nanoparticle film. The protection layer can be laid down as a slurry, including inorganic components and organic components (such as solvents). Solvents can be driven off thermally after protection layer formation.

Molten Salt Electrolytes

A molten salt electrolyte is an electrolyte comprising one or more salts, that is molten (or liquid) at the operating temperatures of the device using the electrolyte. A molten salt electrolyte can also be described as a molten, non-aqueous electrolyte, as an aqueous solvent is not required.

Molten salt electrolytes which may be used in embodiments of the invention are described in U.S. Pat. No. 4,463,071 to Gifford, U.S. Pat. No. 5,552,241 to Mamantov et al., U.S. Pat. No. 5,589,291 to Carlin et al., U.S. Pat. No. 6,326,104 to Caja et al., 6,365,301 to Michot, and U.S. Pat. No. 6,544,691 to Guidotti.

The molten salt electrolyte in the invention may include an onium, such as an ammonium, a phosphonium, an oxonium, a sulfonium, an amidinium, an imidazolium, a pyrazolium, and a low basicity anion, such as $PF_6^-$, $BF_4^-$, $CF_3SO_3^-$, $(CF_3SO_2)N^{31}$, $(FSO_2)_2N^-$. The molten salt electrolyte in the invention may also include $Y^+N^-(—SO_2Rf^2)(—XRf^3)$, where $Y^+$ is a cation selected from the group consisting of an imidazolium ion, an ammonium ion, a sulfonium ion, a pyridinium, a(n) (iso)thiazolyl ion, and a(n) (iso) oxazolium ion, which may be optionally substituted with $C_{1-10}$ alkyl or $C_{1-10}$ alkyl having ether linkage, provided that said cation has at least one substituent of $—CH_2Rf^1$ or $—OCH_2Rf^1$ (where Rf is $C_{1-10}$ polyfluoroalkyl); $Rf^2$ and $Rf^3$ are independently $C_{1-10}$ perfluorophenyl or may together from $C_{1-10}$ perfluoroalkylene; and X is $—SO_2—$ or $—CO—$. In a lithium-based battery, the molten salt electrolyte may also include a lithium salt, such as one or more of the following: $LiPF_6$, $LiAsF_6$, $LiSbF_6$, $LiBF_4$, $LiClO_4$, $LiCF_3SO_3$, $Li(CF_3SO_2)_2N$, $Li(C_2F_5SO_2)_2N$, $LiC_4F_9SO_3$, $Li(CF_3SO_2)_3C$, $LiBPh_4$, LiBOB, and $Li(CF_3SO_2)(CF_3CO)N$.

Protection Layer Formation

The protection layer can form as a reaction between the negative electroactive material and the electrolyte, or between the negative electroactive material and a suitable additive within the electrolyte. The protection layer can be deposited on the negative electrode using chemical or physical deposition methods, such as evaporation, sublimation, physical vapor deposition, chemical vapor deposition, plasma treatment, sputtering, thermal treatment, photochemical treatment, silane treatment, sol-gel process, anodization, and the like.

The protection layer can be formed by any thin film coating or deposition process, alloy formation process, or other process. The protection layer may be used with, or formed by interaction with, an appropriate molten salt electrolyte, or other battery components.

The protection layer may be formed by depositing polymerizable materials on the surface of the negative electrode, and polymerizing in situ to form the protection layer. As used herein, the term polymerization includes copolymerization processes. For example, a solid polymer electrolyte layer may be formed by depositing precursor molecules, followed by polymerization, for example using UV. The precursor molecules may be organic (such as a polymerizable organic molecule) or inorganic (such as a silane derivative).

The protection layer formation may take place at low temperatures (such as liquid nitrogen temperatures) or under an oxygen free atmosphere so as to inhibit reactions of the negative electroactive material during formation of the protection layer.

Protection layers can be formed by adding a small quantity of aqueous or organic material to the molten salt electrolyte, or may be formed by a reaction of a component of the molten salt electrolyte with the lithium electrode, or may be formed by a treatment of a Li metal electrode such as evaporative deposition of a component that reacts with Li to form a protective film. Protection layers can also (or alternatively) be formed on a positive electrode, for example using a composition or formation process as described herein. The protection layer may be formed by a reaction between a material within the molten salt electrolyte and the electron collector, on an initial charge or discharge of the cell.

Hence, in examples of the present invention, an electron collector can be protected against reaction with the electrolyte using a protection layer. The protection layer can be in the form of a uniform thin film, or deposited as particles, such as a nanoparticle film.

Positive Electrode

The positive electrode of a battery (cathode for battery discharge) can be formed from any suitable material. A positive electrode for a lithium-ion battery may comprise lithium cobalt oxide ($Li_xCoO_2$), lithium manganese oxide ($Li_xMn_2O_4$), lithium nickel oxide ($Li_xNiO_2$), other lithium transition metal oxides, lithium metal phosphates, fluorinated lithium metal phosphates, and other lithium metal chalcogenides, where the metal can be a transition metal. The lithium content of the positive electrode or of the negative electrode can vary substantially with battery charge state. The positive electrode may further include an electron-conducting material and a binder.

Other Electrode Components

An electrode (negative electrode or positive electrode) may further include non-electroactive materials such as an electron-conducting material. A non-electroactive material does not substantially interact with the electrolyte under normal operating conditions.

The electron-conducting material may comprise a carbon-containing material, such as graphite. Other example electron-conductive materials include polyaniline or other conducting polymer, carbon fibers, carbon black (such as acetylene black, or Ketjen black), and non-electroactive metals (in, for example, a lithium-ion battery) such as cobalt, copper, nickel, other metal, or metal compound. The electron conducting material may be in the form of particles (as used here, the term includes granules, flakes, powders and the like), fibers, a mesh, sheet, or other two or three-dimensional framework.

An electrode may further include a binder, such as a polyethylene. The binder may be a fluoropolymer such as polytetrafluoroethylene. The binder may comprise one or more inert materials, for the purpose of improving the mechanical properties of the electrode, facilitating electrode manufacture or processing, or other purpose. Example binder materials include fluoropolymers (such as polytetrafluoroethylenes, polyvinylidene difluoride (PVdF), and the like), polyolefins and derivatives thereof, polyethylene oxide, acrylic polymers (including polymethacrylates), synthetic rubber, and the like.

The electrode may further comprise regions of electrolyte, and/or an ion conductive protection layer to separate the negative electrode from the electrolyte, or other component or components. Electrodes may further comprise other non-electrically conducting, non-electroactive materials such as inert oxides, polymers, and the like.

Battery Configurations

An example battery includes a positive electrode, a negative electrode, an electrolyte, the electrolyte including a lithium salt, and first and second current collectors, associated with the negative electrode and positive electrode respectively. Examples of the present invention also molten salt electrolyte batteries, and also include other non-aqueous electrolyte secondary (rechargeable) batteries). An example battery may further include electrical leads and appropriate packaging, for example a sealed container providing electrical contacts in electrical communication with the first and second current collectors.

Batteries may further include one or more separators, located between the negative electrode and positive electrode with the purpose of preventing direct contact between the negative electrode and the positive electrode. The separator is optional, and a solid electrolyte may provide a similar function. A separator may be a porous material, including a material such as a polymer (such as polyethylene or polypropylene), sol-gel material, ormosil, glass, ceramic, glass-ceramic, or other material, and may be in the form of a porous sheet, mesh, fibrous mat (cloth), or other form. A separator may be attached to a surface of one or both electrodes.

Other Applications

Other applications of the negative electrodes described herein include other alkali ion batteries, other rechargeable batteries, other electrochemical devices, and the like.

The examples above generally relate to a lithium ion battery having a molten salt electrolyte. However, the approaches described can be adapted to work with other battery technologies, as will be clear to those skilled in the battery arts. For example, a protection layer can be provided which transmit other ions, as appropriate to the battery technology, or to function with other forms of electrolyte such as organic electrolytes.

Examples discussed above are applicable to various forms of electron collectors. Electron collectors can include aluminum, copper, iron, steel (such as stainless steel), nickel, zinc, electron-conducting polymers, metalized polymers (such as metalized Mylar), and the like.

The electron collector may take any physical form, such as a sheet (planar or curved), rod, mesh, porous, granular, two or three-dimensional lattice, or any other form.

BATTERY CYCLE TEST EXAMPLES

Example 1

A laminate cell was constructed with the materials listed below:

Cathode
Cathode active material: $LiCoO_2$
Electron conductive material: acetylene black
Binder: PVdF
Current collector: Coated Aluminum foil
Coating paste: Disperse acetylene black and PVdF in NMP
Anode
Anode active material: $Li_4Ti_5O_{12}$
Electron conductive material: acetylene black
Binder: PVDF
Current collector: Aluminum foil
Electrolyte
Solvent: EMI-FSI
Lithium salt: Li-TFSI (1.0M)
Separator: PP porous film
Cycle test condition
After conditioning, IC cc-cc charge-discharge for 100 cycles

Example 2

Apply WC powder instead of acetylene black for coating cathode current collector. Other conditions are the same as Ex. 1.

Reference 1

Use aluminum foil as cathode current collector. Other conditions are the same as Ex.1.

Reference 2

Use nickel foil as cathode current collector. Other conditions are the same as Ex.1.

|  | Initial capacity (cathode) mAh/g | Capacity retention ratio |
|---|---|---|
| Example 1 | 122.6 | 95% |
| Example 2 | 118.9 | 97% |
| Reference 1 | 132.2 | 55% |
| Reference 2 | 128.6 | 42% |

Table 1 above shows the results, showing that capacitance retention ratio is highest using WC as a protection layer for the electron collector.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Prov. Pat. App. Ser. Nos. 60/553,443 and 60/553,636, both filed Mar. 16, 2004, and 60/571,776, filed May 17, 2004, are incorporated herein in their entirety.

Having disclosed our invention, we claim:

1. A battery comprising:
   a first electrode;
   a second electrode;
   a molten salt electrolyte; and
   an electron collector, the electron collector being substantially aluminum metal and associated with the first electrode,
   the electron collector having a protection layer extending between and fully separating the first electrode and the electron collector, the protection layer including an aluminum alloy having a lower aluminum content than the electron collector and reducing corrosion of the electron collector by the molten salt electrolyte.

* * * * *